(12) United States Patent
Black et al.

(10) Patent No.: US 9,534,730 B2
(45) Date of Patent: Jan. 3, 2017

(54) MULTI-ARM GIMBAL SYSTEM

(75) Inventors: Micah Black, Grantie Bay, CA (US);
Anthony D. Sacksteder, Philadelphia, PA (US)

(73) Assignee: Garrett W. Brown, Philadelphia, PA (US)

( * ) Notice: Subject to any disclaimer, the term of this patent is extended or adjusted under 35 U.S.C. 154(b) by 620 days.

(21) Appl. No.: 13/217,772

(22) Filed: Aug. 25, 2011

(65) Prior Publication Data

US 2012/0049035 A1    Mar. 1, 2012

Related U.S. Application Data

(60) Provisional application No. 61/377,312, filed on Aug. 26, 2010.

(51) Int. Cl.
| F16M 13/00 | (2006.01) |
| F16M 11/10 | (2006.01) |
| F16M 11/20 | (2006.01) |

(52) U.S. Cl.
CPC .......... *F16M 11/10* (2013.01); *F16M 11/2071* (2013.01); *F16M 2200/041* (2013.01); *Y10T 29/49826* (2015.01)

(58) Field of Classification Search
CPC ............. B23Q 1/54; B23Q 1/25; F16C 11/00; F16M 11/12; F16M 11/123; F16M 11/121; F16M 11/125; F16M 11/126; F16M 11/128; F16M 11/10; F16M 11/2071; F16M 2200/041; Y10T 29/49826

USPC ...... 248/122.1, 123.11, 636, 288.11, 292.11, 248/292.13, 278.1, 279.1, 287.1, 660, 248/661, 662, 664, 667; 384/513; 29/525.01
See application file for complete search history.

(56) References Cited

U.S. PATENT DOCUMENTS

| 289,180 | A | * | 11/1883 | Tregurtha ................. 248/279.1 |
| 316,459 | A | | 4/1885 | How |
| 366,438 | A | | 7/1887 | Tower |
| 470,450 | A | | 3/1892 | Seaman |
| 790,850 | A | | 5/1905 | Pfeiffer |
| 1,758,416 | A | | 5/1930 | Uehling |
| 2,425,602 | A | | 8/1947 | Drescher |
| 2,450,875 | A | | 10/1948 | Braddon et al. |
| 2,490,628 | A | | 12/1949 | Isserstedt |
| 2,599,269 | A | | 6/1952 | Markle |

(Continued)

FOREIGN PATENT DOCUMENTS

| DE | 8904387 | 6/1989 |
| DE | 20305202 | 8/2003 |

(Continued)

OTHER PUBLICATIONS

Rachel Hulin, Induro Introduces Gimbal Tripod Heads!, Induro Blog, Jan. 12, 2010.

(Continued)

*Primary Examiner* — Kimberly Wood
(74) *Attorney, Agent, or Firm* — Diederiks & Whitelaw, PLC

(57) ABSTRACT

The invention provides a gimbal support apparatus to support tools or other payloads for use during performance of tasks using those payloads. The payload can be selectively biased to achieve an optimum position for performance of the task. The gimbal support apparatus comprises rotationally connected gimbal arms that can be adjusted with respect to one another and to an equipoising support arm to attain the selected payload bias.

25 Claims, 19 Drawing Sheets

(56) References Cited

U.S. PATENT DOCUMENTS

| | | | | |
|---|---|---|---|---|
| 2,707,882 | A | 5/1955 | Kent | |
| 2,725,783 | A | 12/1955 | Jackson | |
| 2,763,456 | A | 9/1956 | Breer | |
| 2,839,833 | A | 6/1958 | Hagner | |
| 2,899,882 | A | 8/1959 | Wylie et al. | |
| 2,960,875 | A | 11/1960 | Elwell | |
| 2,961,877 | A | 11/1960 | Edwards | |
| 2,962,251 | A | 11/1960 | Karpf | |
| 3,249,326 | A | 5/1966 | Reister | |
| 3,356,437 | A * | 12/1967 | Beamish | 359/384 |
| 3,467,350 | A * | 9/1969 | Tyler | 248/636 |
| 3,572,326 | A * | 3/1971 | Jensen | A61B 17/0293 600/233 |
| 3,586,278 | A * | 6/1971 | Simons | F16M 11/00 248/121 |
| 3,604,660 | A | 9/1971 | Marley | |
| 3,638,502 | A | 2/1972 | Leavitt | |
| 3,756,549 | A | 9/1973 | Lange | |
| 3,776,494 | A | 12/1973 | Baucheron | |
| 4,017,168 | A | 4/1977 | Brown | |
| 4,033,541 | A | 7/1977 | Malveg | |
| 4,156,512 | A | 5/1979 | Brown | |
| 4,158,490 | A | 6/1979 | Gottschalk | |
| 4,206,983 | A | 6/1980 | Nettman | |
| 4,270,387 | A | 6/1981 | Hoffman | |
| 4,318,522 | A | 3/1982 | Appleberry | |
| 4,360,028 | A * | 11/1982 | Barbier et al. | 600/436 |
| 4,474,439 | A | 10/1984 | Brown | |
| 4,592,352 | A * | 6/1986 | Patil | 606/130 |
| 4,617,916 | A * | 10/1986 | LeVahn | A61B 19/26 600/228 |
| 4,625,938 | A | 12/1986 | Brown | |
| 4,638,798 | A * | 1/1987 | Shelden et al. | 606/130 |
| 4,685,649 | A | 8/1987 | McKay | |
| 4,695,024 | A | 9/1987 | Haven | |
| 4,710,819 | A | 12/1987 | Brown | |
| 4,750,375 | A | 6/1988 | Godesa | |
| 4,756,655 | A | 7/1988 | Jameson | |
| 4,946,272 | A | 8/1990 | Brown | |
| 4,981,156 | A | 1/1991 | Nicklas et al. | |
| 4,989,466 | A | 2/1991 | Goodman | |
| 5,037,053 | A | 8/1991 | Fox et al. | |
| 5,098,182 | A | 3/1992 | Brown | |
| 5,129,911 | A * | 7/1992 | Siczek et al. | 600/429 |
| D329,449 | S | 9/1992 | Brown et al. | |
| 5,163,430 | A * | 11/1992 | Carol | 600/429 |
| 5,163,649 | A | 11/1992 | Schehr | |
| 5,213,293 | A | 5/1993 | Muentener et al. | |
| 5,229,798 | A | 7/1993 | Brown | |
| 5,280,427 | A * | 1/1994 | Magnusson et al. | 600/407 |
| 5,370,585 | A * | 12/1994 | Thomey et al. | 474/112 |
| 5,389,987 | A | 2/1995 | Corbeil | |
| D358,832 | S | 5/1995 | Lenney | |
| 5,509,630 | A | 4/1996 | Bringuier | |
| 5,537,205 | A | 7/1996 | Costa et al. | |
| 5,579,071 | A | 11/1996 | Wetzel | |
| 5,609,316 | A | 3/1997 | Tigliev | |
| 5,662,591 | A * | 9/1997 | Peindl et al. | 601/24 |
| 5,732,912 | A * | 3/1998 | Nomura et al. | 248/187.1 |
| 5,742,859 | A | 4/1998 | Acker | |
| 5,752,112 | A | 5/1998 | Paddock | |
| 5,876,333 | A * | 3/1999 | Bigliani | A61B 17/02 600/231 |
| 5,908,181 | A * | 6/1999 | Valles-Navarro | F16M 11/20 248/177.1 |
| 5,915,664 | A * | 6/1999 | Butler | 248/640 |
| 5,963,749 | A | 10/1999 | Nicholson | |
| 5,984,930 | A * | 11/1999 | Maciunas et al. | 606/130 |
| 6,030,130 | A | 2/2000 | Paddock et al. | |
| 6,149,506 | A | 11/2000 | Duescher | |
| 6,188,849 | B1 | 2/2001 | Staicouras | |
| 6,293,676 | B1 | 9/2001 | Holway | |
| 6,377,011 | B1 | 4/2002 | Ben-Ur | |
| 6,530,930 | B1 * | 3/2003 | Marino et al. | 606/130 |
| 6,575,644 | B2 | 6/2003 | Paddock et al. | |
| 6,578,967 | B1 | 6/2003 | Paddock | |
| 6,663,055 | B2 * | 12/2003 | Boucher et al. | 248/118 |
| 6,857,787 | B1 | 2/2005 | Meier et al. | |
| 6,896,230 | B2 | 5/2005 | Cvek | |
| 7,000,883 | B2 | 2/2006 | Mercadal | |
| 7,065,888 | B2 | 6/2006 | Jaklitsch et al. | |
| 7,166,113 | B2 * | 1/2007 | Arambula et al. | 606/130 |
| 7,371,028 | B2 | 5/2008 | Gordon | |
| 7,562,851 | B2 | 7/2009 | Hein et al. | |
| 7,618,016 | B2 | 11/2009 | Brown | |
| 7,625,090 | B2 | 12/2009 | Brown et al. | |
| 2006/0231700 | A1 | 10/2006 | Orf | |
| 2006/0262274 | A1 | 11/2006 | Brown et al. | |
| 2006/0263082 | A1 | 11/2006 | Brown et al. | |
| 2007/0019330 | A1 | 1/2007 | Wolfersberger | |
| 2007/0050139 | A1 | 3/2007 | Sidman | |
| 2007/0080275 | A1 | 4/2007 | Stachowski et al. | |
| 2007/0127912 | A1 | 6/2007 | Jones et al. | |
| 2008/0046122 | A1 | 2/2008 | Manzo | |
| 2009/0086355 | A1 | 4/2009 | Ohno et al. | |
| 2010/0065705 | A1 | 3/2010 | Brown et al. | |

FOREIGN PATENT DOCUMENTS

| | | |
|---|---|---|
| EP | 0192253 | 8/1986 |
| EP | 429008 | 5/1991 |
| EP | 1312251 | 5/2003 |
| GB | 593231 | 10/1947 |
| GB | 810608 | 3/1959 |
| GB | 2170651 | 8/1986 |
| GB | 2325393 | 11/1998 |
| WO | 0016950 | 3/2000 |
| WO | 2008112687 | 9/2008 |
| WO | 2009039047 | 3/2009 |
| WO | 2010030404 | 3/2010 |

OTHER PUBLICATIONS

International Search Report and Written Opinion dated Jan. 11, 2012 for PCT Patent Application No. PCT/US2011/049104.

* cited by examiner

MULTI-ARM GIMBAL SYSTEM

This application claims priority to U.S. Provisional Patent Application No. 61/377,312, filed Aug. 26, 2010.

BACKGROUND OF THE INVENTION

In many industrial, business and medical environments, workers are required to repetitively lift, position and orient tools and objects of significant weight, and deploy them anywhere within the reach of their arms, from low to overhead to extending out in front. The resulting stresses, particularly from overhead usages, or near-full extension of the arm, are a common cause of work-related shoulder and forearm injuries.

Ergonomic equipment supports are known in the art, including 'tool balancers' that suspend tools on wires from retractable reels, and articulated support arms that work in conjunction with two or three-axis gimbal attachments to provide angular freedom between the arm and the supported equipment. These support systems typically require the tool to be supported at its center of gravity. This can be a challenge because the center-of-gravity of a given tool is often located within a non-cylindrical section of the tool body, which may inhibit the installation of a gimbal bearing assembly of appropriate size. Also, it may be desirable for the various gimbal axes of rotation not to converge at the center-of-balance of a given tool, if the use of such tool would be facilitated by non-neutral balance, for example, by the tool hanging 'at rest' at a particular angle that helps accomplish the task.

Further, the existence of large-diameter gimbal rings may obstruct or inhibit the use of certain tools by blocking the operator's hands or sight-lines. In fact some tools have such limited and particular mounting opportunities (such as appropriate handles, bosses, brackets, etc.) that no concentric gimbal rings can usefully be attached.

It would therefore, be advantageous to provide an apparatus to selectively bias the 'resting' angle of a gimbaled tool to suit the user's preference, and further to include adjustable motion inhibiting devices such as friction components rotation stops, and pinch-point protection.

Accordingly, there is a need for a versatile, ergonomic, and angularly agile gimballed tool support system, which can accommodate tools of various sizes, shapes, configurations and internal distributions of mass, as well as varying operator access constraints, and which can preferably be simply, rapidly and accurately set up at the workplace.

SUMMARY OF THE INVENTION

The invention provides a gimbal support apparatus to support tools or other payloads for use during performance of tasks using those payloads. The payload can be selectively biased to achieve an optimum position for performance of the task. The gimbal support apparatus comprises rotationally connected gimbal arms that can be adjusted with respect to one another and to an equipoising support arm to attain the selected payload bias.

In an exemplary embodiment of the invention the gimbal support apparatus includes a first and second gimbal arm rotationally connected to one another. The first gimbal arm is further rotationally connected to a payload support and the second gimbal arm is rotationally connected to an equipoising support arm. The position of the three axes of rotation formed can be adjusted by adjusting the position of the gimbal arms and payload support with respect to one another. By selectively locating the intersection of the axes of rotation, the desired bias of the tool position can be achieved.

DESCRIPTION OF THE DRAWINGS

The invention is best understood from the following detailed description when read in conjunction with the accompanying drawings.

DETAILED DESCRIPTION OF THE INVENTION

Embodiments of the invention include a gimbal support apparatus that is adjustable to selectively bias the resting position of a supported payload. The payload may be for example, a tool, workpiece, diagnostic equipment, or other object that can be supported by the apparatus.

Selective biasing can be accomplished by adjusting the point at which virtual axes of rotation of the gimbal intersect, such as at the center of gravity of the payload, or removed from the center of gravity to provide a tilted resting position. Or, if desired, the virtual axes can be adjusted so they do not all intersect at a common point. "Virtual axis" is used to describe the infinite length imaginary axis which is an extension of a bearing or other axis of rotation.

The gimbal system can provide a connection between a payload and a support arm, such as a zeroG® equipoising arm, to provide further degrees of freedom and maneuverability. In a illustrative embodiment of the invention, the gimbal support apparatus allows gimbals to be adjusted on all axis of motion, providing six degrees of freedom to not only provide a large range of motion but to reduce or minimize input forces required to effectuate rotational motion of the tool about each axis. Motion can be for example, about substantially perpendicular axes providing for roll, pitch or yaw.

Exemplary embodiments of the invention accommodate payloads of various sizes, shapes, configurations and internal distributions of mass, as well as varying operator access constraints. Embodiments of the apparatus can secure a payload so it is balanced about its center of mass, even if obstructions, bends, bulges, projections, or the like prevent the appropriate installation of a conventional, unitary bearing assembly. Preferably, the multiple pivot axes of the gimbal support apparatus can be easily adjusted such that their centerlines converge at, or approximately at, the center of balance of the tool if desired, or offset from the center of balance to allow the tool to hang in a desired orientation. Particular embodiments of the invention can be simply and accurately set up onsite and easily and reliably re-adapted, re-centered and re-adjusted at the user site to accommodate variations in tool configuration and operator preference.

Figure 1:
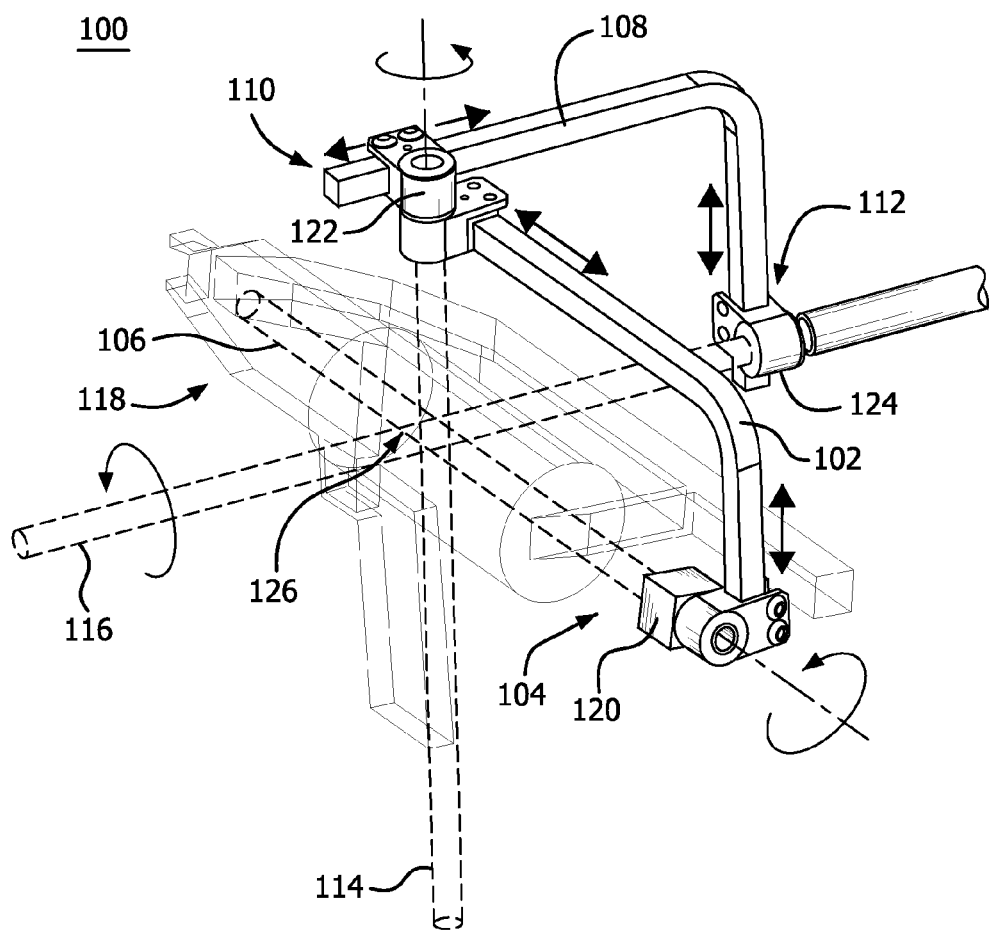
FIG. 1 depicts a gimbal support apparatus according to an illustrative embodiment of the invention.

FIG. 1 depicts a gimbal support apparatus 100 according to an illustrative embodiment of the invention. A payload support 104 is rotationally connected to a first gimbal arm 102 about a first axis 106. Arrows in the figures indicating rotation are illustrative only, and do not limit the rotation to either clockwise or counterclockwise. Unless a rotation inhibiting device is included, rotation can be in either direction. First gimbal arm 102 has a 90° bend to enable it to clear the rotational space occupied by the payload.

Figure 16:
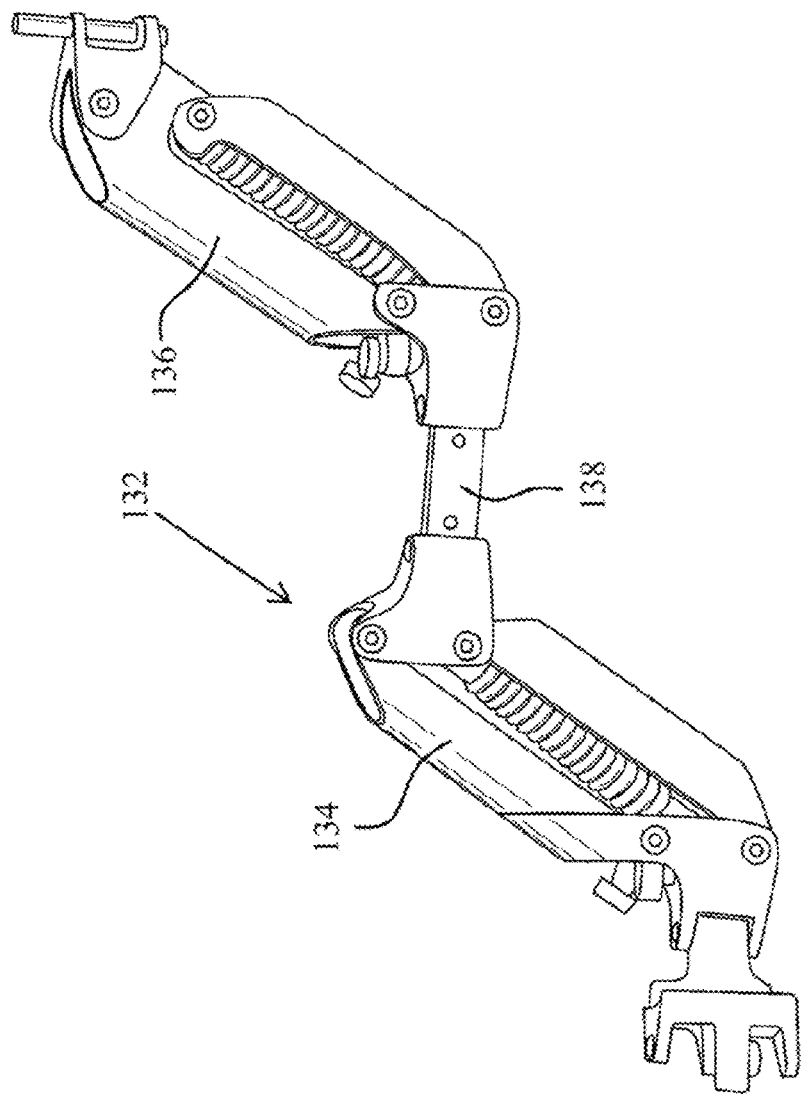
FIG. 16 depicts an equipoising arm according to an illustrative embodiment of the invention.

A second gimbal arm 108, having a first end 110 and a second end 112, is rotationally attached to first gimbal arm 102 about a second axis 114 at second gimbal arm first end 110. Second gimbal arm 108 is attached to a post 130 at its second end 112, which can be rotationally attached about a third axis 116 to a support arm (not shown). Post 130 is just one possible configuration for attachment of the support arm. The equipoising support arm may be for example a zeroG® arm by Equipois, Inc. or other articulating lifting arms, such as support arm 132 depicted in FIG. 16. Although the support arm in FIG. 16 shows two lifting segments 134, 136 connected by component 138 the arm can contain one or more lifting segments.

The gimbal support apparatus has an adjustment system to selectively bias the resting position of a payload 118 supported by the payload support. FIG. 1 depicts an adjustment system according to an illustrative embodiment of the invention. The adjustment system includes a plurality of bearings housings 120, 122, 124 moveably attached to the gimbal arms. Bearing housings are preferably mounted oriented on the same side of a given bar to keep bearing axes at either end in line. Note that bearing "housing" 122 actually consists of two bearing assemblies forming a single pivot point. Bearing housings can also be replaced by other rotational connection devices that allow rotational connection of two components such as the gimbal arms.

By moving bearing housings 120, 122, 124 along at least a portion of the length of the gimbal arms as shown by the arrows in FIG. 1, the positions of first axis 106, second axis 114 and third axis 116 with respect to one another is changed. Arrows in the figures indicating adjustment of the bearing housings 120, 122, 124 along gimbal arms are illustrative only. Utilizing gimbal arms with different bend configurations also serves to position the axes as desired. Axes 106, 114, 116 can be located so they intersect at the center of gravity 126 of the payload. It may also be desirable to locate the intersection elsewhere to bias the payload in a particular position suitable for the application for which it is used. For example, the system can be adjusted to hang or tilt a payload. In some instances a user may choose to not have the axes all converge at a single point.

In FIG. 1, first bearing housing 120 connects first gimbal arm 102 to payload support 104. First bearing housing 120 is attached adjustably along at least a portion of first gimbal arm 102 such as by a clamp or other mechanism, to first gimbal arm 102. First gimbal arm 102 is rotatable about first axis 106 by way of first bearing housing 120.

A second bearing housing 122 connects first gimbal arm 102 and second gimbal arm 108. Second bearing housing 122 is attached adjustably along at least a portion of second gimbal arm 108 to second gimbal arm 108. First gimbal arm 102 and second gimbal arm 108 are rotatable around second axis 114 via second bearing housing 122.

The actual full interface between the tool and the first axis is not shown in FIG. 1, but can be accomplished in a variety of ways, provided the tool is secured in a manner that withstands the forces exerted in performance of the task and the weight of the tool, and which does not adversely impact use of the tool, but creating substantial obstructions for example. The interface should also allow the tool to be neutrally balanced, or balanced in a manner that is preferable for the user's specific application.

An illustrative tool interface provides an additional rotational axis by including a gimbal within which the tool is mounted. The subordinate means of these systems are radial set screws which bear down upon a tool, or a band clamp that surrounds the tool and engages brackets that reach from the inner ring to the tool. Tool interfaces will be described further below with respect to FIGS. 15A-C.

Figure 2:
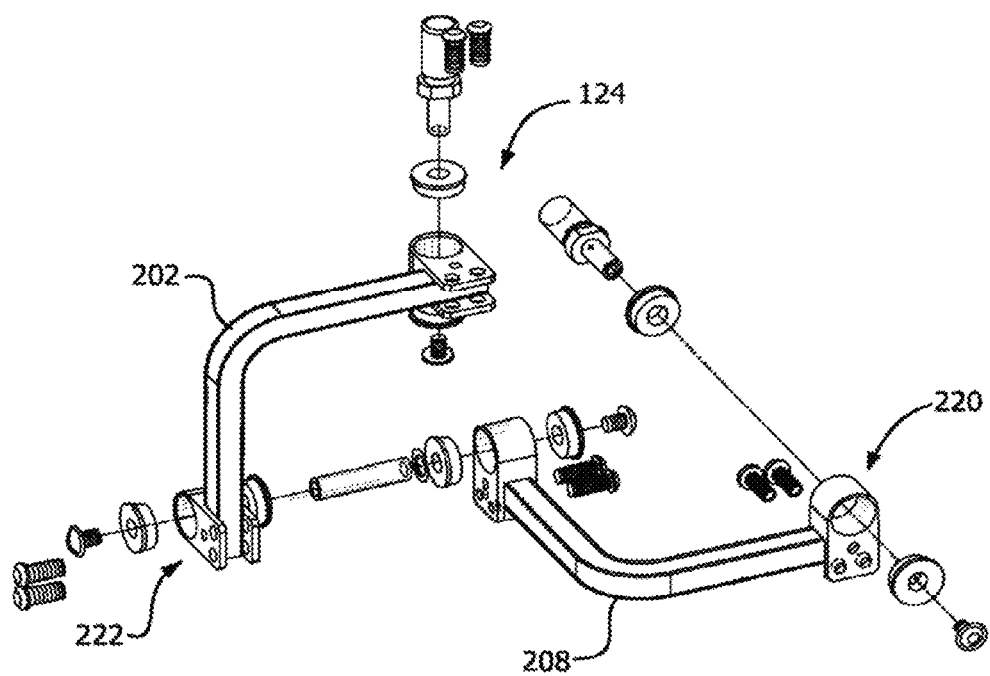
FIG. 2 depicts an exploded view of two gimbal arms and bearing housings according to an illustrative embodiment of the invention.

FIG. 2 depicts an exploded view of two gimbal arms 202, 208 and bearing housings 220, 222, 224 according to an illustrative embodiment of the invention. Gimbal arms 202 and 208 are connected to one another via bearing housing 222. A tool support can be connected at bearing housing 224, and an equipoising or other articulated support arm can be connected at bearing housing 220, for example by a post as described above, more directly to the housing, or by another mechanism that could handle the weights and forces to which it would be subjected, but still allow the desired rotation and clearances.

Figure 3:
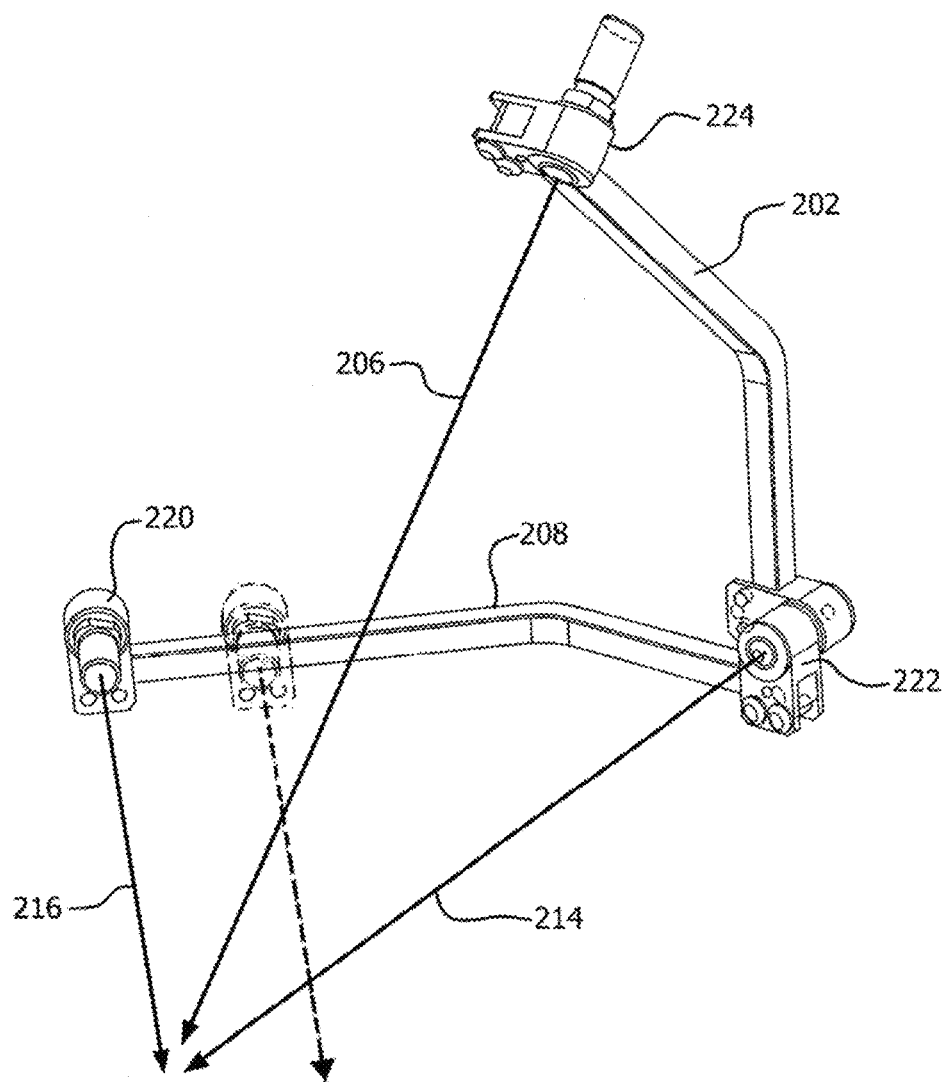
FIG. 3 depicts convergence of gimbal arm rotational axes and also depicts by broken lines non-convergence of rotational axes according to an illustrative embodiment.

FIG. 3 depicts gimbal arms 202, 208 and bearing housings 220, 222, 224 of FIG. 2 connected and shows bearing housing rotational axes 206, 214, 216 converging at substantially a single point. If bearing housing 220 is moved along gimbal arm 208 as shown by broken lines, the rotational axes of bearing housing 220, 222, and 224 no longer converge.

Figure 4:
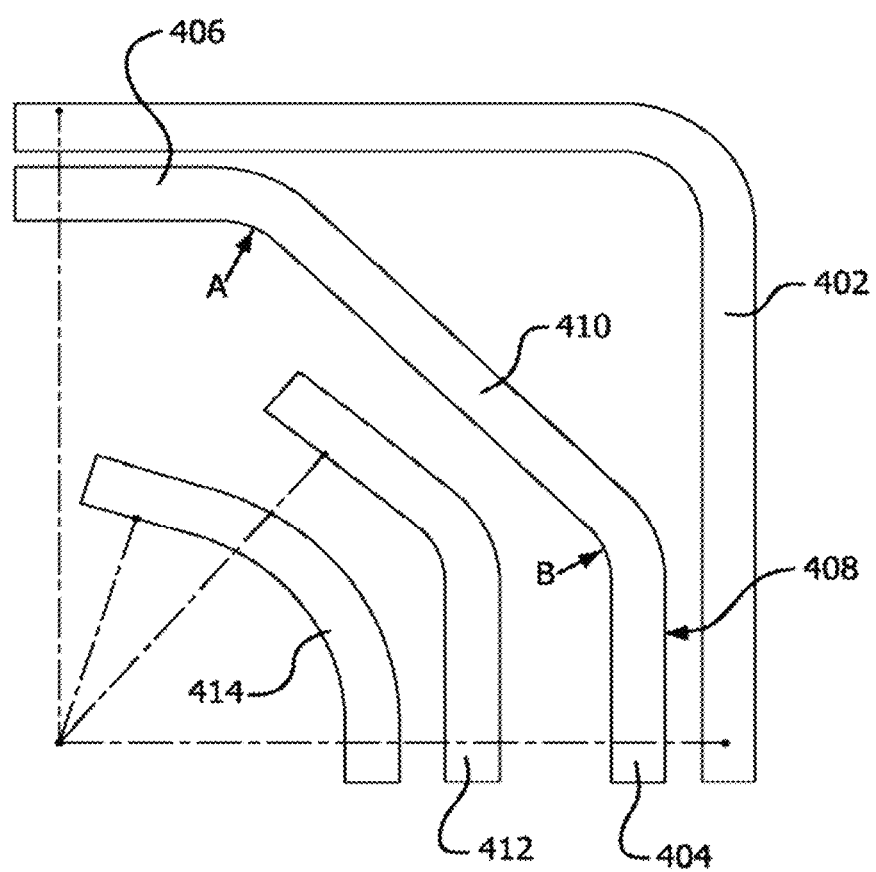
FIG. 4 depicts four gimbal arms with various bends according to illustrative embodiments of the invention.

FIG. 4 depicts four gimbal arms according to illustrative embodiments of the invention. Different applications and payloads will determine the optimum bends in the gimbal arms. The arms can be used with one another or two or more arms of the same configuration can be used to create a gimbal structure. This is true with respect to various arm configurations used. Gimbal arm 402 has a bend of about 90°. Gimbal arm 404 has two bends A, B resulting in the arm having three linear sections: outer sections 406, 408 and middle section 410. Outer sections 406, 408 each have a bend of about 45° with respect to middle arm section 410, resulting in the angle of 90° between outer arm section 406, 408, if extended virtually to their intersection. Gimbal arm 412 has an acute radius. Gimbal arm 414 has a larger acute radius. Illustrative arm radii ranges include about 1.6 inches to about 3.0 inches; about 1.65 inches to about 1.70 inches; and about 1.9 inches to about 3.0 inches.

In an illustrative embodiment of the invention a normal to a linear surface of each of the first gimbal arm, second gimbal arm and the first axis intersects. See FIG. 4 for an illustration of normals to various arm configurations.

Figure 5:
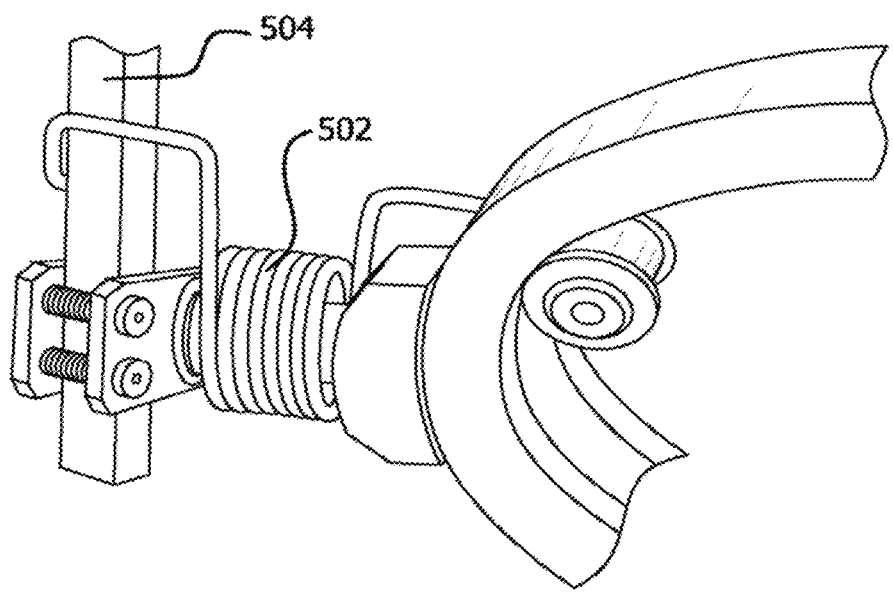
FIG. 5 depicts a rotation limit stop according to an illustrative embodiment of the invention.

FIG. 5 depicts a rotation limit stop or balancing torsion force device, according to an illustrative embodiment of the invention. One or more rotation limit stops can be employed when it is desirable to limit the rotational motion about one or more axes. Other motion inhibiting devices, including rotational and translational stops and devices that resist motion, but do not fully arrest it, can be included. The motion inhibiting devices can limit motion to a selected degree or hampering it by providing resistance, for example by increasing friction between parts of the apparatus. A torsion spring 502 may be disposed at one or more rotational intersections of a gimbal arm 504 in a manner to provide a balancing torsion force. The torsion spring or other suitable component that creates friction, or otherwise inhibits rotational motion, can also be employed to control the axial motion by increasing the force necessary to rotate an arm about an axis. In an illustrative embodiment of the invention, the friction at one or more bearing housings can be adjusted to control a response across the connection.

FIGS. 7A-E depict a rotation limit stop assembly according to an illustrative embodiment of the invention. Bearing housing 640 has an opening 642 to accommodate axle 644. A rotation limit insert 646 having an annular shape with a gap 648, partially surrounds axle 644. Rotation limit insert 646 is fixedly secured to axle 644 such as by a pin 650 to arrest respective rotation of axle 644 with respect to opening 642. Rotation limit insert 646 has an inside radius of close tolerance with an outside radius of axle 644 and an outside radius of close tolerance to an inside radius of opening 642 in bearing housing 640. A rotation limit keystone 652 fits within the rotation limit insert gap 648 and has an angular span 654 that is smaller than the rotation limit insert gap angular span 656, thereby allowing axle 644 to rotate within bearing housing 640 to a degree equal to the difference between angular span 656 of rotation limit insert gap 648 and the angular span 654 of rotation limit keystone 652.

The rotation limit insert keystone and the rotation limit insert can have various complimentary shapes, provided the combination allows axle 644 to rotate within opening 642 in bearing housing 640, and limits rotation of axle 644, without interfering with other functions of the bearing assembly and the support apparatus. The desired range of motion can be selected by choice of particular rotation limit inserts and rotation limit keystones.

Figure 8A:
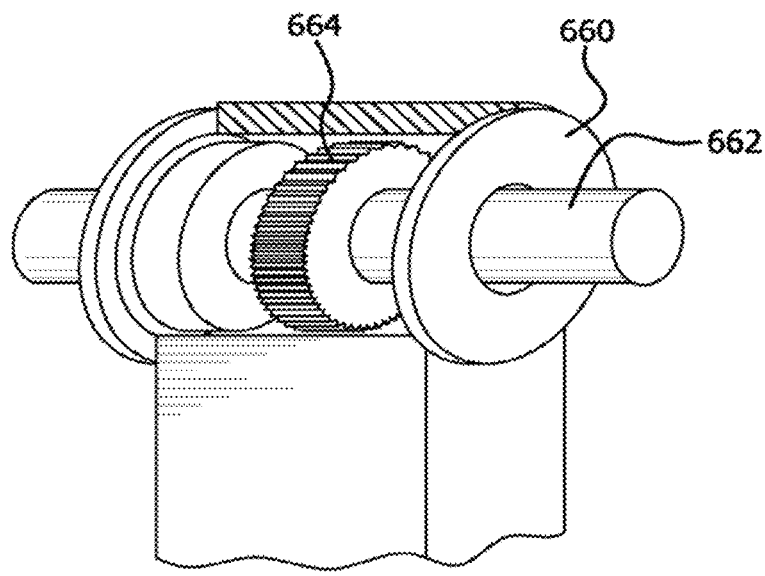
FIGS. 8A-B depict a rotation limiting device according to a further embodiment of the invention.
Figures 8B, 9:
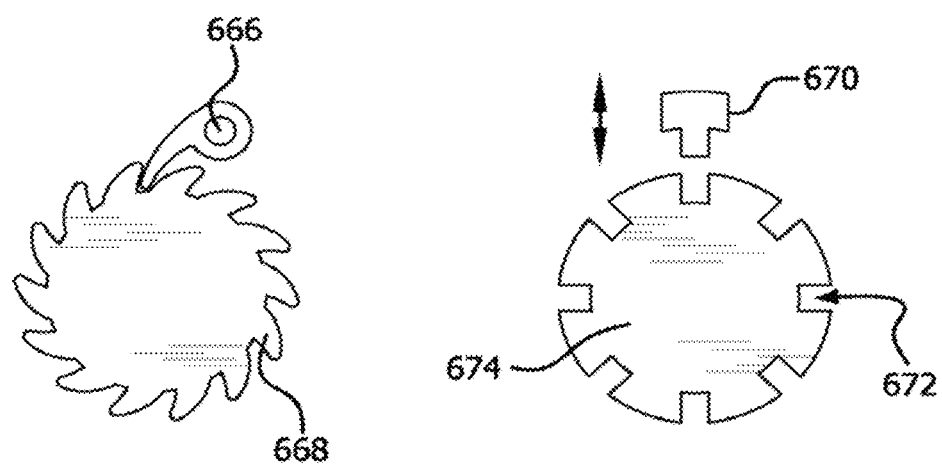
FIG. 9 depicts a rotation limiting device according to a further illustrative embodiment of the invention.

Locking mechanisms can be incorporated into the gimbal systems to lock an arm in a desired position. The locking mechanisms may be part of the rotation limit stop components or other rotation inhibiting component, or can be separate mechanisms from them. FIG. 8A depicts a rotation limiting device according to a further embodiment of the invention. A bearing assembly has a bearing housing 660 through which an axle 662 is disposed. A pawl ring 664 is disposed around axle 662. A pawl 666, such as shown in FIG. 8B, engages teeth on pawl ring 664. The configuration of the teeth and positioning of the pawl allows axle 662 to rotate in one direction only. This allows selective one-way rotation of axle 662.

In a further embodiment of the invention, at least one section of the pawl ring perimeter has teeth 668 to provide a ratcheting effect and at least one section of the wheel perimeter has a surface that does not provide a ratcheting effect, such as a smooth surface. In a further illustrative embodiment of the invention, a second ratcheting pawl device is disposed in parallel to the first ratcheting pawl device. The first ratcheting pawl device allows rotation in a clockwise direction through a first range of motion and the second ratcheting pawl device allows rotation in a counter-clockwise direction through a second, non-intersecting range of motion. Other combinations of ratcheting effects can also be implemented.

FIG. 9 depicts a further rotation limiting device according to an illustrative embodiment of the invention. The rotation limiting device includes a pin 670 to selectively engage a plurality of complimentary cavities 672 on the perimeter of a locking wheel 674 at a plurality of discrete positions. Ramped projections (not shown) can be provided on the perimeter of locking wheel 674 at the incoming side of the cavities to allow only one-way rotation.

Figure 10:
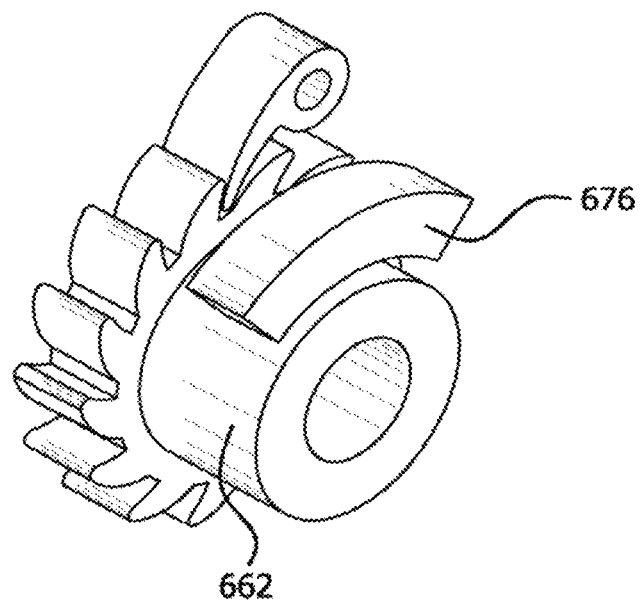
FIG. 10 depicts a rotation limiting device according to a further illustrative embodiment of the invention.

FIG. 10 depicts a rotation limiting device according to a further illustrative embodiment of the invention. A radial force resistance device 676, in the form for example of a tensioning pad or shoe, engages a hub surface on axle 662.

Figure 11A:
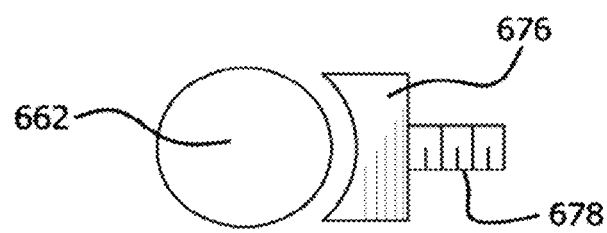
FIGS. 11A-B depict two views of a rotation limiting device according to an illustrative embodiment of the invention.
Figure 11B:
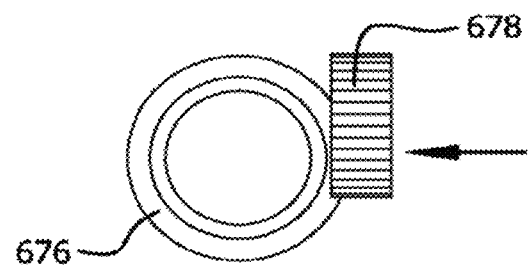

FIGS. 11A-B depict a set screw 678 or other device that can be provided to set the force exerted on axle 662 by radial force resistance device 676. Activation could also be initiated by a solenoid. An electronic control device can also be used to activate and deactivate a rotation limiting device.

The gimbal support apparatus can include one or more rotation inhibiting devices such as a friction device, ratcheting device and locking device. Devices analogous to some of those described can also be implemented to limit translational motion or adjustments.

Figure 6:
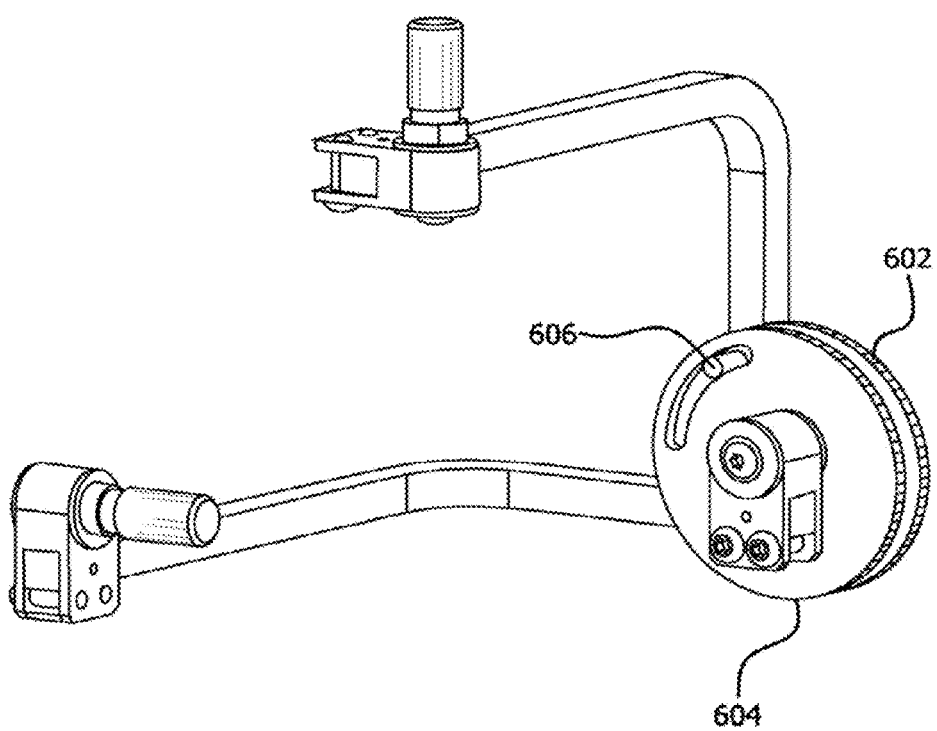
FIG. 6 depicts a pair of angle limiting disks having selectable stopping points.
Figure 7A:
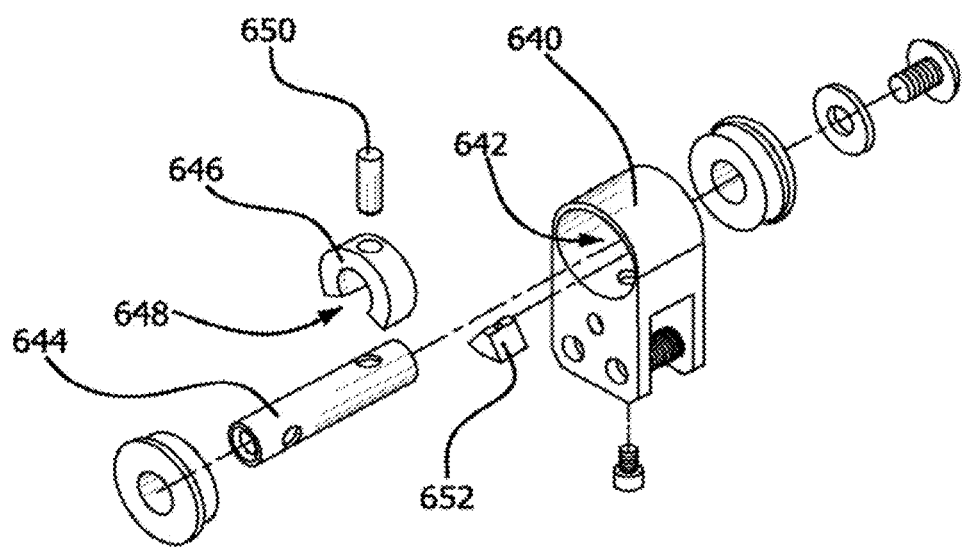
FIGS. 7 A-E depict components of a rotation limit stop assembly according to an illustrative embodiment of the invention.
Figure 7B:
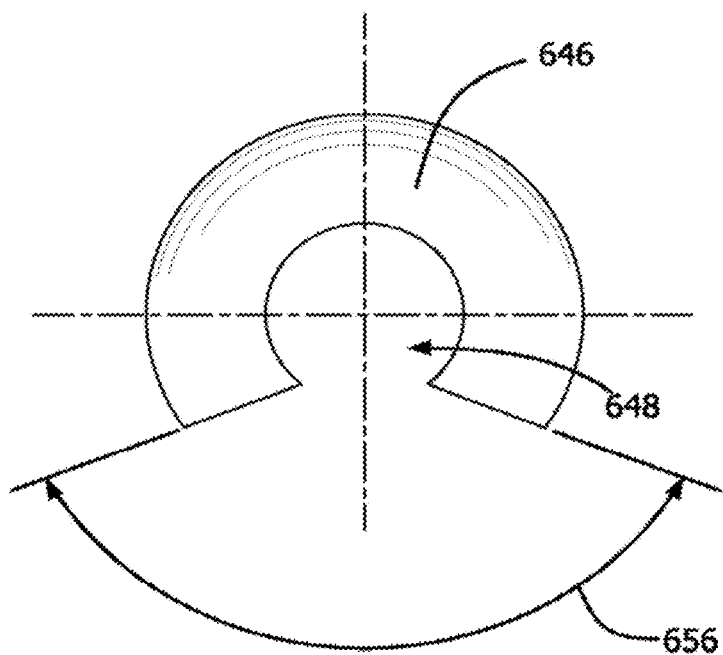
Figure 7C:
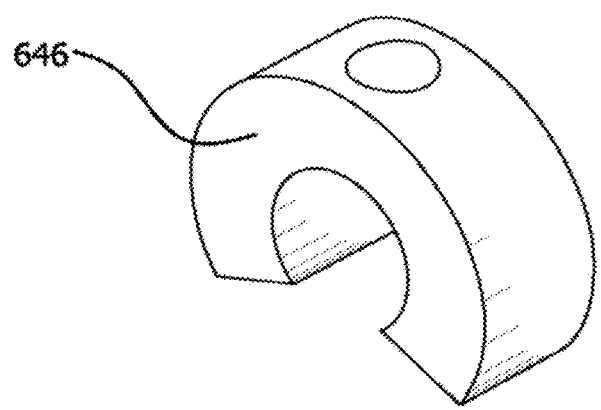
Figure 7D:
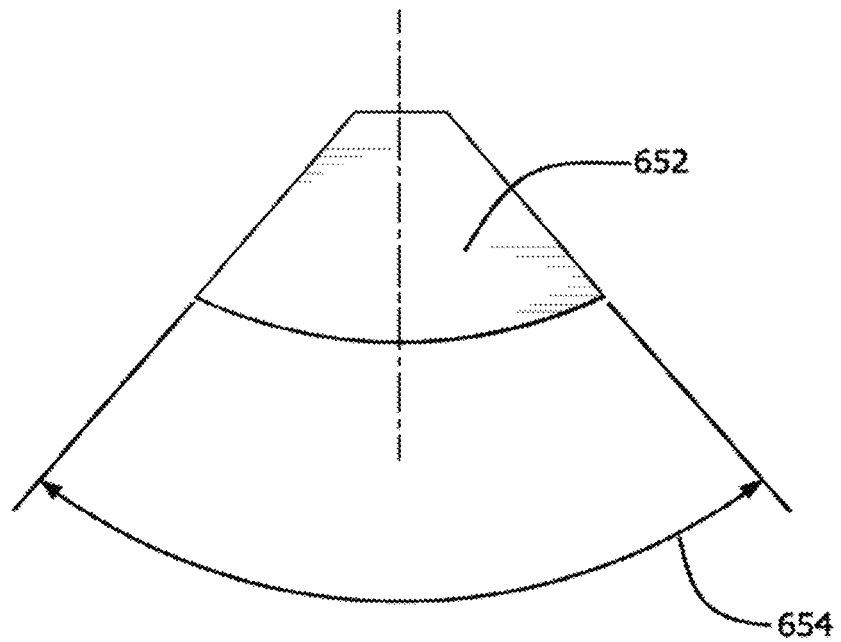
Figure 7E:
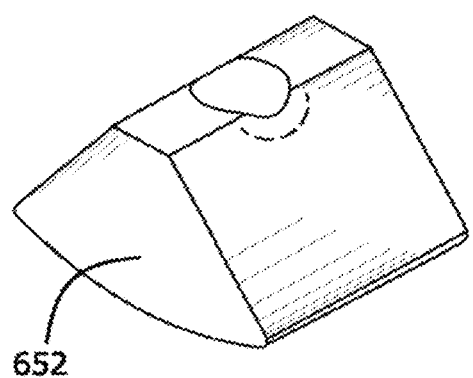

Rotational inhibiting devices can also serve as pinch protection mechanisms. A disk, preferably metal, can be placed between two bearings to eliminate a pinch point. FIG. 6 depicts a pair of angle limiting disks 602, 604 having selectable stopping points set by setting mechanism 606.

The gimbal arms can have a variety of cross-sectional shapes. In an illustrative embodiment of the invention one or more of the gimbal arms has at least one flat side and an associated rotational device has a complimentary flat surface. This allows adjustment of the bearings yet easily retains mutually orthogonal alignments or other chosen alignments. Typically, this will be accomplished most easily using bars with square cross-sections because they are readily available. Gimbal arms can also be constructed of round stock. Round bar adaptors can be provided as desired, for example, to adapt a square bearing housing to accept a round bar.

Figure 12A:
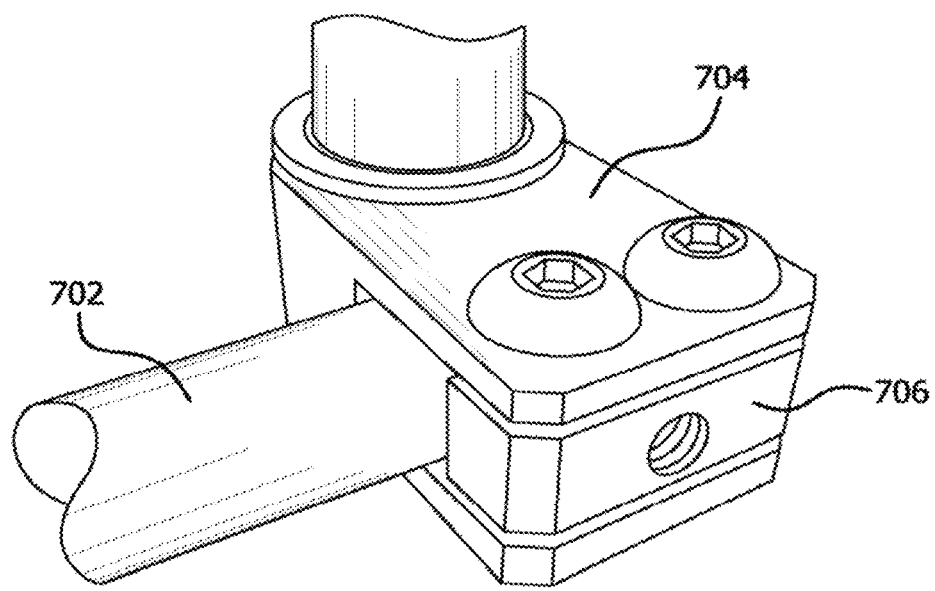
FIGS. 12A-B depict a device to secure gimbal arms to one another or other components according to an illustrative embodiment of the invention.
Figure 12B:
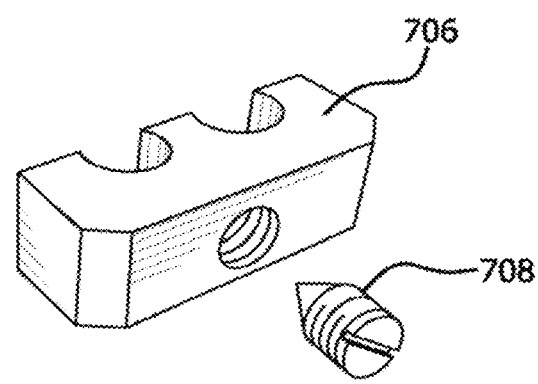

FIGS. 12A-B depict a device to provide secure clamping and location of round gimbal arms. Round gimbal arm 702 is placed through bearing housing 704. A gimbal arm securing device 706 is inserted into bearing housing 704. A set screw 708 is advanced toward gimbal arm 702 until it encounters gimbal arm 702 with sufficient force to inhibit it from rotating.

Figure 13:
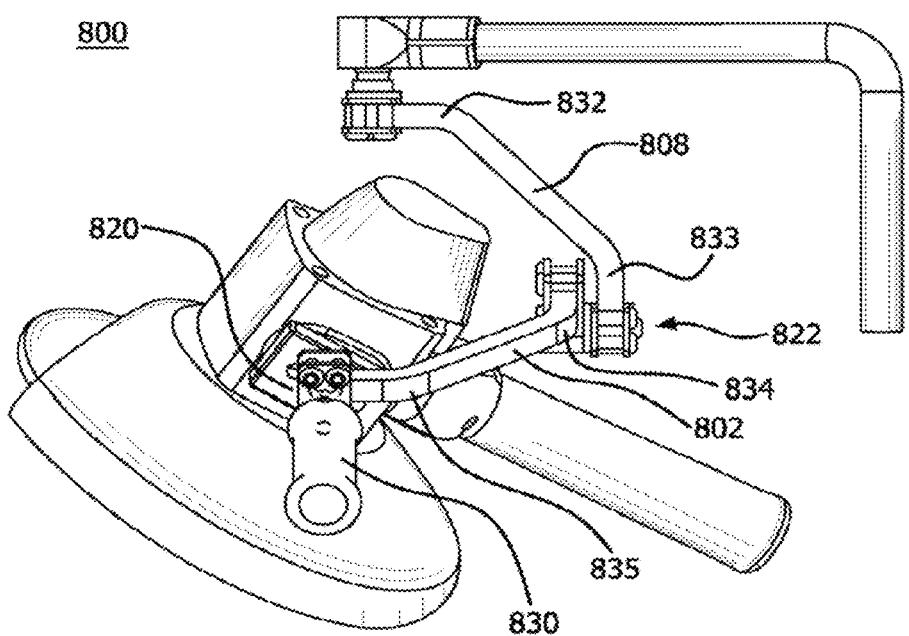
FIG. 13 depicts a tool 800 secured in a gimbal system according to an illustrative embodiment of the invention.

FIG. 13 depicts a tool 800 secured in a gimbal system according to an illustrative embodiment of the invention. Gimbal arm 802 is rotationally connected to a tool support via a bearing housing 820. A payload gripping bracket 830 is attached to the tool support to assist a user in manipulating tool 800. The gripping bracket may be attached, for example, by threaded engagement. Other non-permanent attachment mechanisms are desirable because they create a more versatile apparatus that can be used with different payloads and different gripping components. Gimbal arm 808 is rotationally attached to gimbal arm 802 via bearing housing 822. Gimbal arms 802, 808 have bends 832, 833, 834, 835 to provide a desired range of motion by clearing obstructions, which can include for example, the tool itself and the gimbal arms. The payload support may be universal to accommodate a plurality of different payloads.

Load limits on the gimbal support system are important with regard to proper functioning of the apparatus. In an illustrative embodiment of the invention, the net moment of force on any part of the gimbal support system should be less than about 225 in-lbs force. In a further embodiment of the invention, the moment of force is less than about 200 in-lbs force. The limit may vary depending on the gimbal arm material, length and cross-sectional diameter and the type of ball bearing connections used, for example. In an exemplary embodiment of the invention, the lengths of the gimbal arms are each less than about 15 inches. An illustrative arm length range is about 8 inches to about 15 inches.

Figure 14:
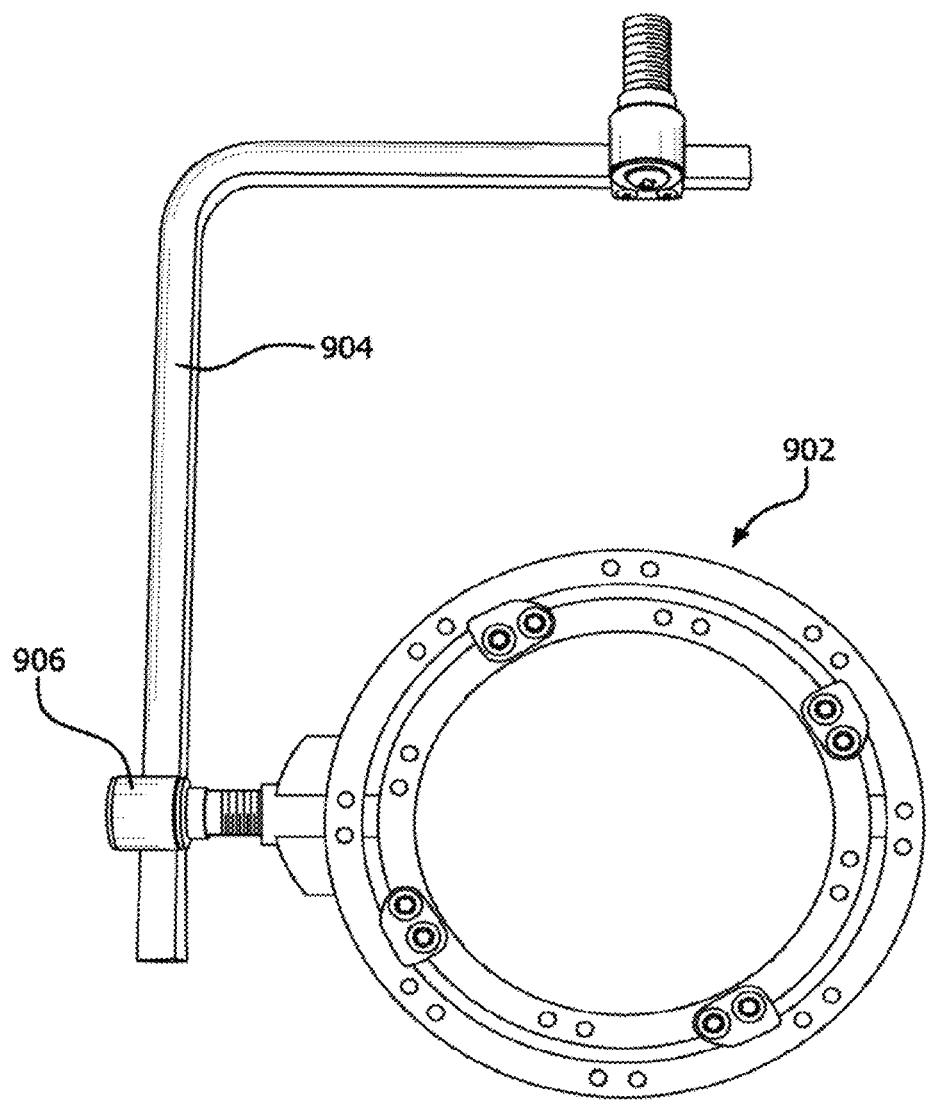
FIG. 14 depicts an arm with a ring gimbal attached according to an illustrative embodiment of the invention.

Illustrative examples of payloads and arm length are as follows for a system in which no part of the system should experience more than a 200 in-lbs moment.
 a. Example 1: 10 lb tool with 15 in longest arm length=10*15=150 in-lb moment
 b. Example 2: 20 lb tool with 8 in longest arm length=20*8=160 in-lb moment FIG. 14 depicts an arm with a ring gimbal attached according to an illustrative embodiment of the invention. Gimbal 902 is attached to arm 904 via bearing 906. Gimbal 902 can be threadedly attached for example.

The gimbal support apparatus can be provided as a kit to be used with a variety of different payloads. A kit according to an illustrative embodiment of the invention includes: a plurality of gimbal arms of varying shapes and/or straight arms that can be bended. The kit can include a device to facilitate bending the gimbal arms to desired or particular degrees. Such a device preferably allows the arms to be bended easily, while preserving their orthogonal relationship to each other without complicated set-up jigs and tools, and readily facilitate the adjustment and centering of multiple gimbal axes for angularly agile, substantially unobstructed payload rotations. The kit components preferably allow structures to be built for orienting and positioning a variety of shaped tools, while providing substantially unrestricted or optimum angular freedom. The kit can further include a plurality of bearing housings configured to be adjustably attached to the gimbal arms; a payload support; and at least one bearing housing configured to be attached to the payload support. The apparatus can be configured to be attached to, and the kit can include, an equipoising support arm. Two of the plurality of gimbal arms can be attached to one another and the payload support to create a gimbal having degrees of freedom through which a payload connected to the payload support can rotate.

The invention also includes a method of balancing a payload using a gimbal apparatus according to embodiments of the invention, and a method of creating a gimbal apparatus. An illustrative method of setting up a gimbal support apparatus will now be described with reference to FIGS. 15A-C. Careful consideration of the first axis 920, which includes the tool connection, should be made when configuring the multi-arm gimbal support apparatus. First axis 920 should permit tool rotation in the most utilized direction by the operator. In many cases, especially for pistol grip and other similar assembly tools, this will coincide with the longitudinal axis of the tool body. This can become particularly important in cases where reaction torque is present and must be addressed.

Figure 15A:
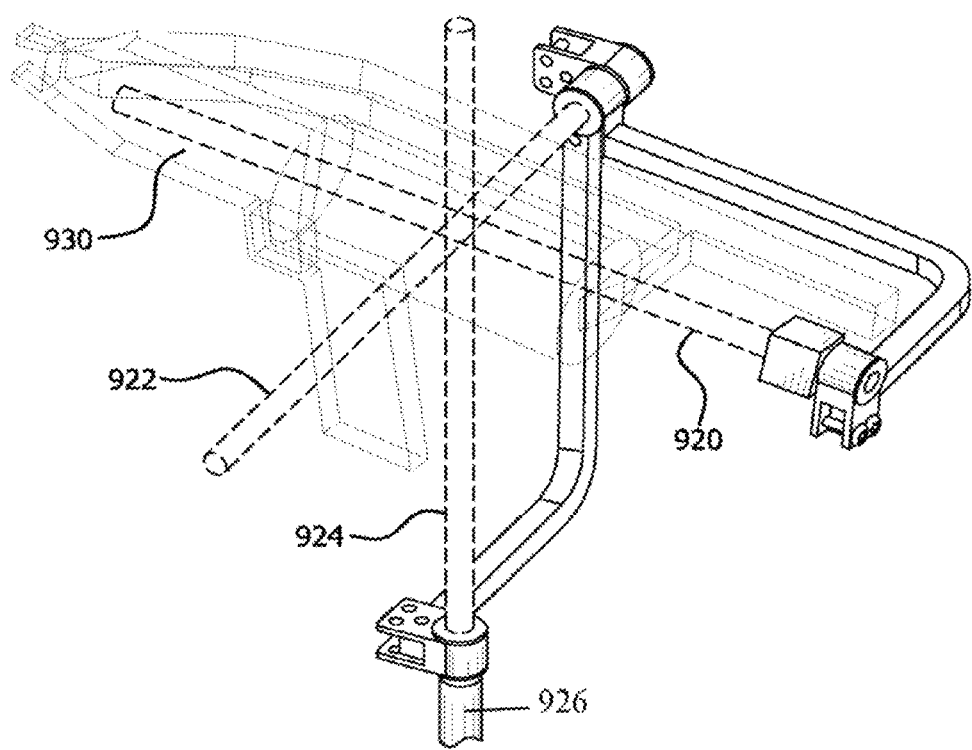
FIGS. 15A-C depict methods of setting up a gimbal support apparatus according to illustrative embodiments of the invention.

There are different options for positioning first axis 920. FIG. 15A shows one option in which first axis 920 coincides with the longitudinal direction of tool 930 and is positioned at the rear of tool 930. If this was an assembly tightening tool, this configuration axis would permit torque reaction without transmitting forces to other elements of the system.

Figure 15B:
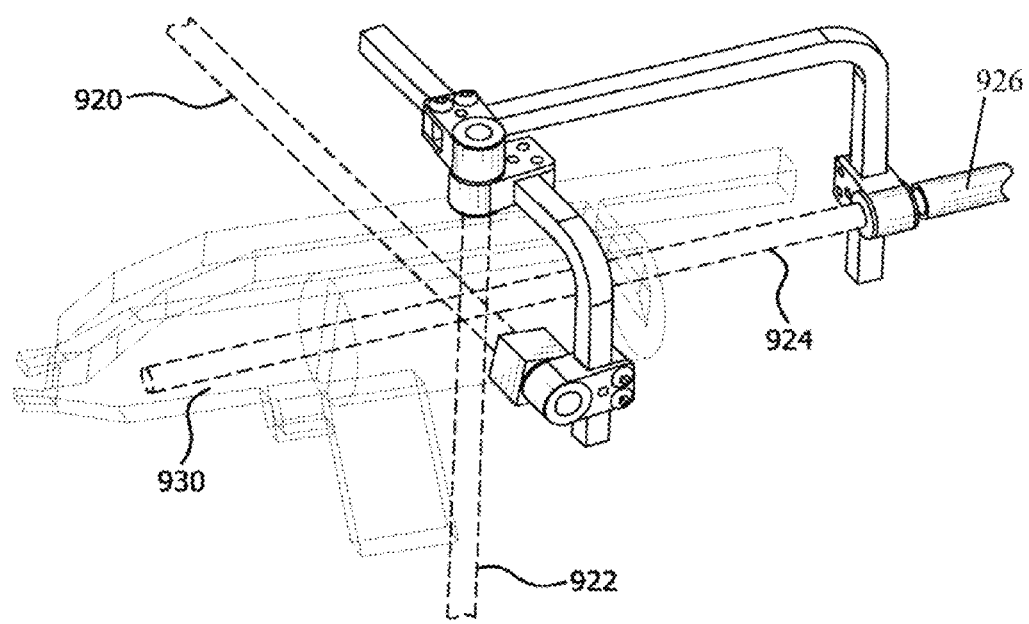

A second option for the positioning of first axis 920 is shown in FIG. 15B. In this option, first axis 920 is positioned at the side of tool 930. If this was an assembly tightening tool this configuration would conditionally transfer torque reaction through the second axis (top) to the third axis (back), depending on the orientation at the second axis.

Second axis 922 is generally a result of the choices for first axis 920 and third axis 924.

Placement of third axis 924 (equipoising arm for example, or other support arm system connection) is important because it determines the overall interaction between the support arm and the gimbal arms. Third axis 924 can be angled with respect to a horizontal or vertical plane.

Figure 15C:
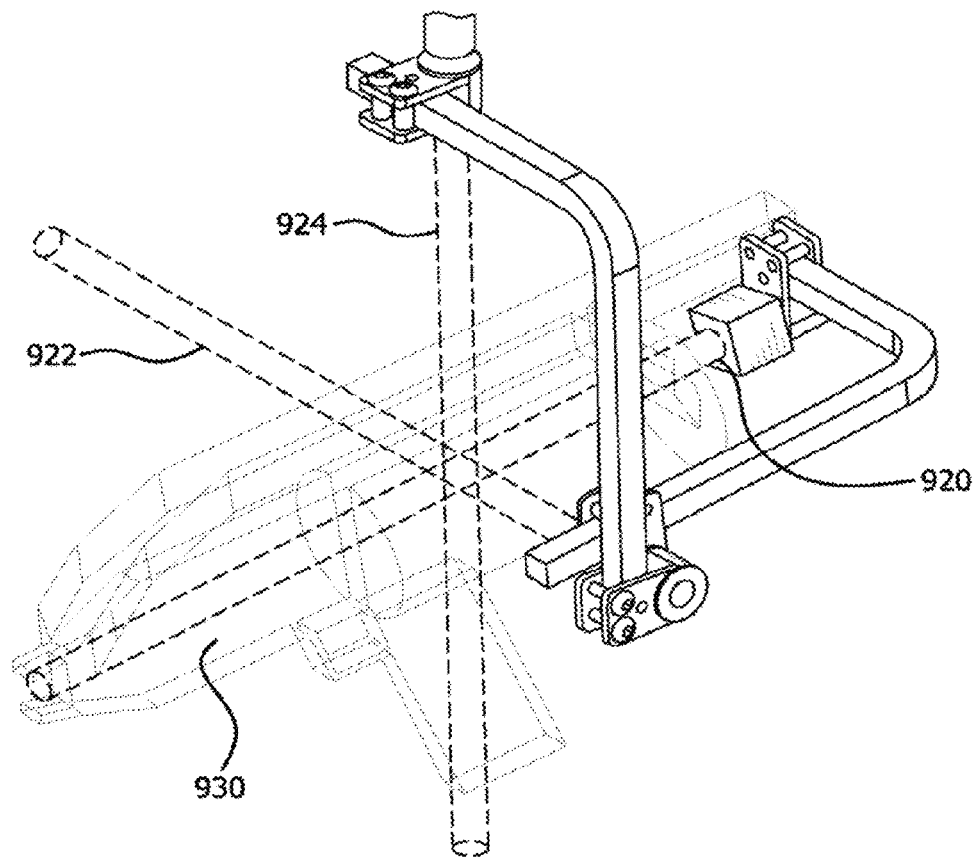
Figure 17:
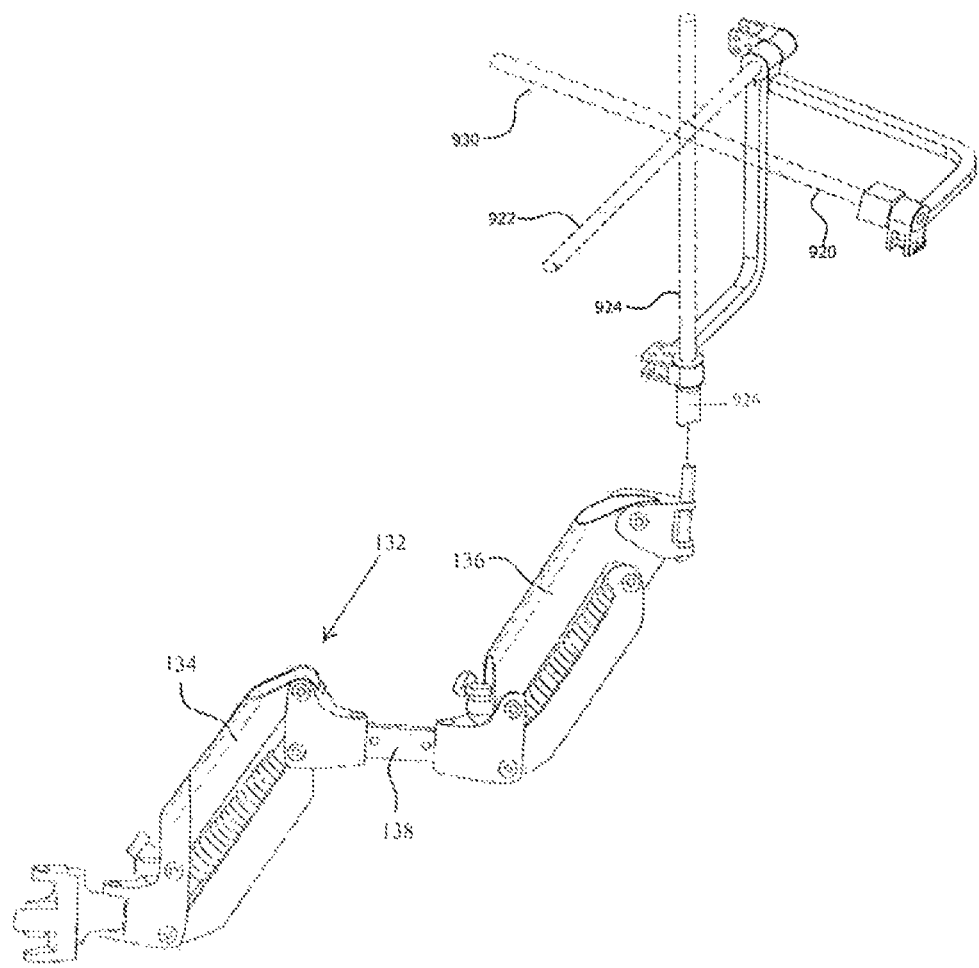
FIG. 17 depicts the gimbal support apparatus of FIG. 15C aligned with the support arm of FIG. 16.

FIGS. 15 A-C show that a tool integrated with the gimbal support system can be oriented such that the first axis closest to the tool can be to the right, left or behind the tool; and by extension below, in front or at any non-orthogonal angle relative to the tool. Three basic positions for third axis 924 are shown in FIGS. 15A-C. They will be described with respect to the position of the support arm. The support arm is not fully shown in FIGS. 15A-C; however, a post 926 to which a support arm can be secured is depicted. FIG. 17 shows the gimbal support apparatus of FIG. 15C aligned with the support arm of FIG. 16. A broken line from post 926 to the support arm shows how they would come together. FIG. 15A depicts third axis 924 in an "over-slung" position wherein tool 930 is supported over the support arm. FIG. 15B shows third axis 924 in "mid-slung" position, wherein tool 930 is supported at a position that is substantially level with the support arm. FIG. 15C depicts third axis 924 in an "under-slung" position wherein tool 930 is hung underneath the support arm.

Tool 930 can be secured by brackets that are purpose built for each tool on an as needed basis according to these general principles:
 a) the tool mounting bracket connects the tool to the gimbal's first axis or first arm in a manner such that the tool is neutrally balanced, or balanced in a manner that is preferable for the user's specific application.
 b) whenever possible, the tool mounting bracket connects to existing features or bosses on the tool itself, and preferably in a manner that maintains the center of gravity orientation of all axes.

Universal brackets can also be implemented for a variety of tools, provided the brackets can satisfy requirement "a" described above, and the tool is adequately secured to withstand forces to which it will be subjected. The brackets should also not significantly interfere with performance of the task at hand.

A phenomenon, which will be referred to as "gimbal lock/alignment" occurs when the two gimbal arms align creating a two axis system from a three axis system. If the gimbal movement momentarily crosses by this orientation it generally will not cause any significant adverse performance. If the system is set up so it frequently rests in this position, or is intended to be used in this position performance will be hampered. If this occurs either the orientation of the axes should be changed or the balance of the gimbal should be altered so it biases away from the gimbal lock/alignment position.

Various embodiments of the invention have been described, each having a different combination of elements. The invention is not limited to the specific embodiments disclosed, and may include different combinations of the elements disclosed and their equivalents.

While the invention has been described by illustrative embodiments, additional advantages and modifications will occur to those skilled in the art. Therefore, the invention in its broader aspects is not limited to specific details shown and described herein. Modifications may be made without departing from the spirit and scope of the invention. Accordingly, it is intended that the invention not be limited to the specific illustrative embodiments, but be interpreted within the full spirit and scope of the appended claims and their equivalents.

The invention claimed is:

1. A gimbal support apparatus comprising:
    a gimbal having:
        a first gimbal arm rotationally connected to a payload support about a first axis via a first rotation connection device;
        a second gimbal arm having a first end and a second end, the second gimbal arm rotationally connected to the first gimbal arm about a second axis via a second rotation connection device at the first end of the second gimbal arm;
        the second gimbal arm configured at the second end to be rotationally connected about a third axis to an equipoising support arm via a third rotation connection device; and
    an adjustment system to selectively bias a hanging resting position of a payload supported by the payload support;
    wherein the adjustment system comprises components to adjust the positions of the first axis, second axis and the third axis each with respect to one another including:
    the first rotation connection device adjustably attached to the first gimbal arm along at least a portion of a length of the first gimbal arm, wherein a direction of adjustment of the first rotation connection device is not coincident with the first axis of rotation;
    the second rotation connection device adjustably attached to the first gimbal arm along at least a portion of the length of the first gimbal arm, wherein a direction of adjustment of the second rotation connection device relative to the first gimbal arm is not coincident with the second axis of rotation;
    the second rotation connection device further adjustably attached to the second gimbal arm along at least a portion of a length of the second gimbal arm, wherein a direction of adjustment of the second rotation connection device relative to the second gimbal arm is not coincident with the second axis of rotation; and
    the third rotation connection device adjustably attached to the second gimbal arm along at least a portion of the length of the second gimbal arm, wherein a direction of adjustment of the third rotation connection device is not coincident with the third axis of rotation.

2. The gimbal support apparatus of claim 1 wherein the first, second and third axes are adapted to be adjustable to converge at the center of gravity of the payload.

3. The gimbal support apparatus of claim 1 further comprising a pinch protection component.

4. The gimbal support apparatus of claim 3 wherein the pinch protection component comprises a disk disposed between two bearings.

5. The gimbal support apparatus of claim 1 wherein friction of at least one rotation connection device of the first, second and third rotation connection devices can be adjusted to control a response across the at least one rotation connection device.

6. The gimbal support apparatus of claim 1 wherein at least one of the first or second gimbal arms has a plurality of rotation connection devices attached thereto, and for the at least one of the first or second gimbal arms with a plurality of rotation connection devices attached thereto, the plurality of rotation connection devices are mounted on the same side of the at least one of the first or second gimbal arms.

7. The gimbal support apparatus of claim 1 wherein at least one of the first gimbal arm and second gimbal arm has a bend.

8. The gimbal support apparatus of claim 7 wherein a normal to a linear surface of each of the first gimbal arm, second gimbal arm and the first axis intersects.

9. The gimbal support apparatus of claim 7 wherein at least one of the first gimbal arm and second gimbal arm has a substantially right angle.

10. The gimbal support apparatus of claim 7 wherein at least one of the first gimbal arm and second gimbal arm has a double bend wherein two outer portions of the at least one of the first gimbal arm and second gimbal arm form a substantially right angle at a virtual intersection of the two outer portions.

11. The gimbal support apparatus of claim 7 wherein at least one of the first gimbal arm and second gimbal arm has a radius in a range of about 1.6 inches to about 3.0 inches.

12. The gimbal support apparatus of claim 7 wherein at least one of the first gimbal arm and second gimbal arm has a radius in a range of about 1.65 inches to about 1.70 inches.

13. The gimbal support apparatus of claim 7 wherein at least one of the first gimbal arm and second gimbal arm has a radius in a range of about 1.9 inches to about 3.0 inches.

14. The gimbal support apparatus of claim 1 wherein at least one of the first gimbal arm and the second gimbal arm has at least one flat side and an associated rotational connection device has a complimentary flat surface.

15. The gimbal support apparatus of claim 1 further comprising a payload gripping bracket attached to the payload support.

16. The gimbal support apparatus of claim 1 wherein the payload support is universal to accommodate a plurality of different payloads.

17. The gimbal support apparatus of claim 1 wherein a net moment of force is less than about 225 in-lbs force.

18. The gimbal support apparatus of claim 1 wherein a net moment of force is less than about 200 in-lbs force.

19. The gimbal support apparatus of claim 1 wherein a length of the first gimbal arm and a length of the second gimbal arm are each less than about 15 inches.

20. A method of supporting a payload comprising:
    providing a gimbal support apparatus according to claim 1:
    selectively biasing the resting position of the payload supported by the gimbal support apparatus by:
        selecting a location on or within the payload for securing the payload to the gimbal support apparatus;
        selecting an orientation of the first axis with respect to the payload; and
        selecting an orientation of the third axis with respect to the equipoising support arm.

21. The method of claim 20 further comprising:
adjusting the first and second gimbal arms with respect to one another thereby selectively biasing the resting position of the payload supported by the gimbal support apparatus.

22. The gimbal support apparatus of claim 1 wherein:
the first, second, and third axes are selectively adjustable to a position wherein the first, second and third axes of rotation to converge at the center of gravity of the payload and positions wherein the first, second and third axes converge other than at the center of gravity of the payload.

23. The gimbal support apparatus of claim 1 wherein:
the first, second, and third axes are selectively adjustable to position the first, second and third axes of rotation to all intersect at a common point and all not intersect at a common point.

24. A gimbal support apparatus comprising:
a first gimbal arm rotationally connected to a payload support about a first axis via a first rotation connection device;
a second gimbal arm having a first end and a second end, the second gimbal arm rotationally connected to the first gimbal arm about a second axis via a second rotation connection device at the first end of the second gimbal arm;
the second gimbal arm configured at the second end to be rotationally connected about a third axis to an equipoising support arm via a third rotation connection device; and
an adjustment system to selectively bias a resting position of a payload supported by the payload support;
wherein the adjustment system comprises components to adjust positions of the first axis, second axis and the third axis each with respect to one another including:
the first rotation connection device adjustably attached to the first gimbal arm along at least a portion of a length of the first gimbal arm, wherein a direction of adjustment of the first rotation connection device is not coincident with the first axis of rotation;
the second rotation connection device adjustably attached to the first gimbal arm along at least a portion of the length of the first gimbal arm, wherein a direction of adjustment of the second rotation connection device relative to the first gimbal arm is not coincident with the second axis of rotation;
the second rotation connection device further adjustably attached to the second gimbal arm along at least a portion of a length of the second gimbal arm, wherein a direction of adjustment of the second rotation connection device relative to the second gimbal arm is not coincident with the second axis of rotation;
the third rotation connection device adjustably attached to the second gimbal arm along at least a portion of the length of the second gimbal arm, wherein a direction of adjustment of the third rotation connection device is not coincident with the third axis of rotation; and
at least one rotation limiting device that is a rotational motion inhibitor comprising at least one torsion spring disposed at at least one rotational intersection of the first or second gimbal arm configured to provide a balancing torsion force.

25. A gimbal support apparatus comprising:
a first gimbal arm rotationally connected to a payload support about a first axis via a first rotation connection device;
a second gimbal arm having a first end and a second end, the second gimbal arm rotationally connected to the first gimbal arm about a second axis via a second rotation connection device at the first end of the second gimbal arm;
the second gimbal arm configured at the second end to be rotationally connected about a third axis to an equipoising support arm via a third rotation connection device; and
an adjustment system to selectively bias a resting position of a payload supported by the payload support;
wherein the adjustment system comprises components to adjust the positions of the first axis, second axis and the third axis each with respect to one another including:
the first rotation connection device adjustably attached to the first gimbal arm along at least a portion of a length of the first gimbal arm, wherein a direction of adjustment of the first rotation connection device is not coincident with the first axis of rotation;
the second rotation connection device adjustably attached to the first gimbal arm along at least a portion of the length of the first gimbal arm, wherein a direction of adjustment of the second rotation connection device relative to the first gimbal arm is not coincident with the second axis of rotation;
the second rotation connection device further adjustably attached to the second gimbal arm along at least a portion of a length of the second gimbal arm, wherein a direction of adjustment of the second rotation connection device relative to the second gimbal arm is not coincident with the second axis of rotation;
the third rotation connection device adjustably attached to the second gimbal arm along at least a portion of the length of the second gimbal arm, wherein a direction of adjustment of the third rotation connection device is not coincident with the third axis of rotation; and
wherein at least one of the first gimbal arm and the second gimbal arm has at least one flat side and an associated rotational connection device has a complimentary flat surface.

* * * * *